Aug. 12, 1941. W. IVEN 2,252,378
MOWER
Filed March 23, 1939 4 Sheets-Sheet 1

Inventor
Willy Iven
By Paul O. Pippel
Atty.

Aug. 12, 1941.   W. IVEN   2,252,378
MOWER
Filed March 23, 1939   4 Sheets-Sheet 2

Inventor
Willy Iven
By Paul O. Pippel
Atty.

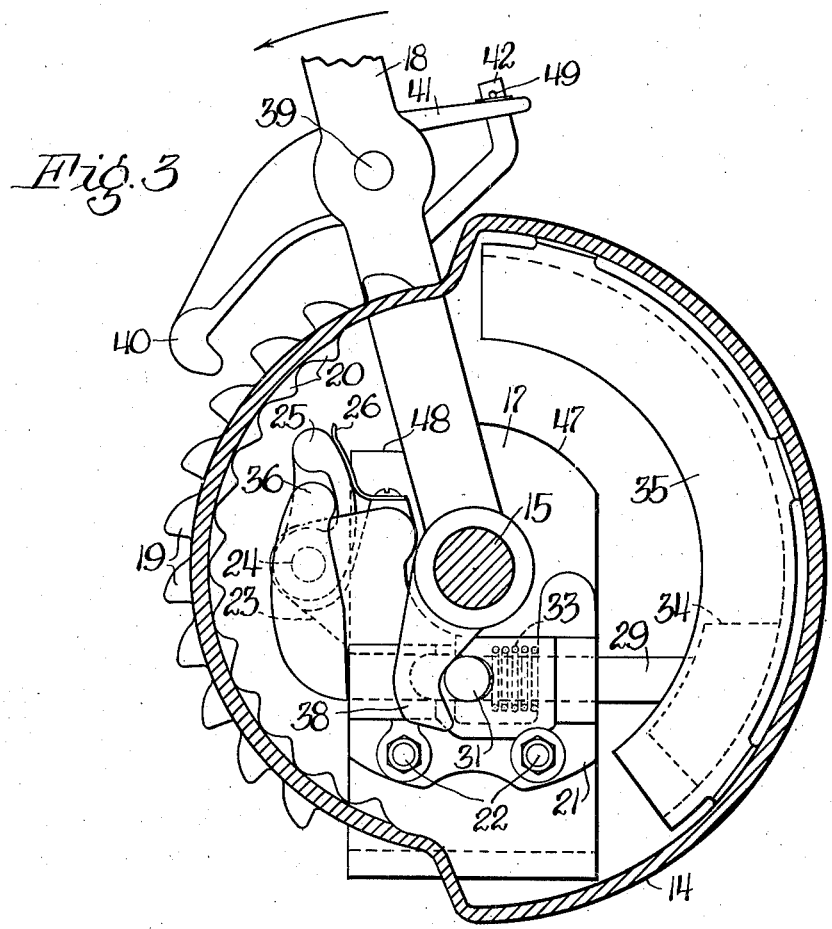
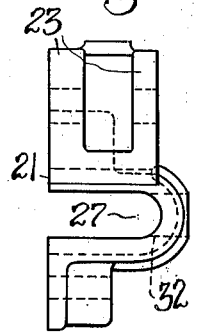
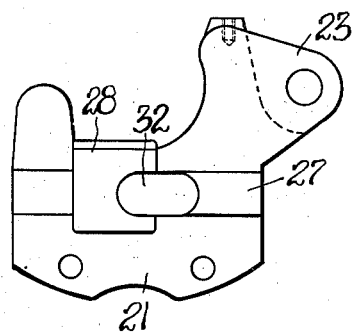

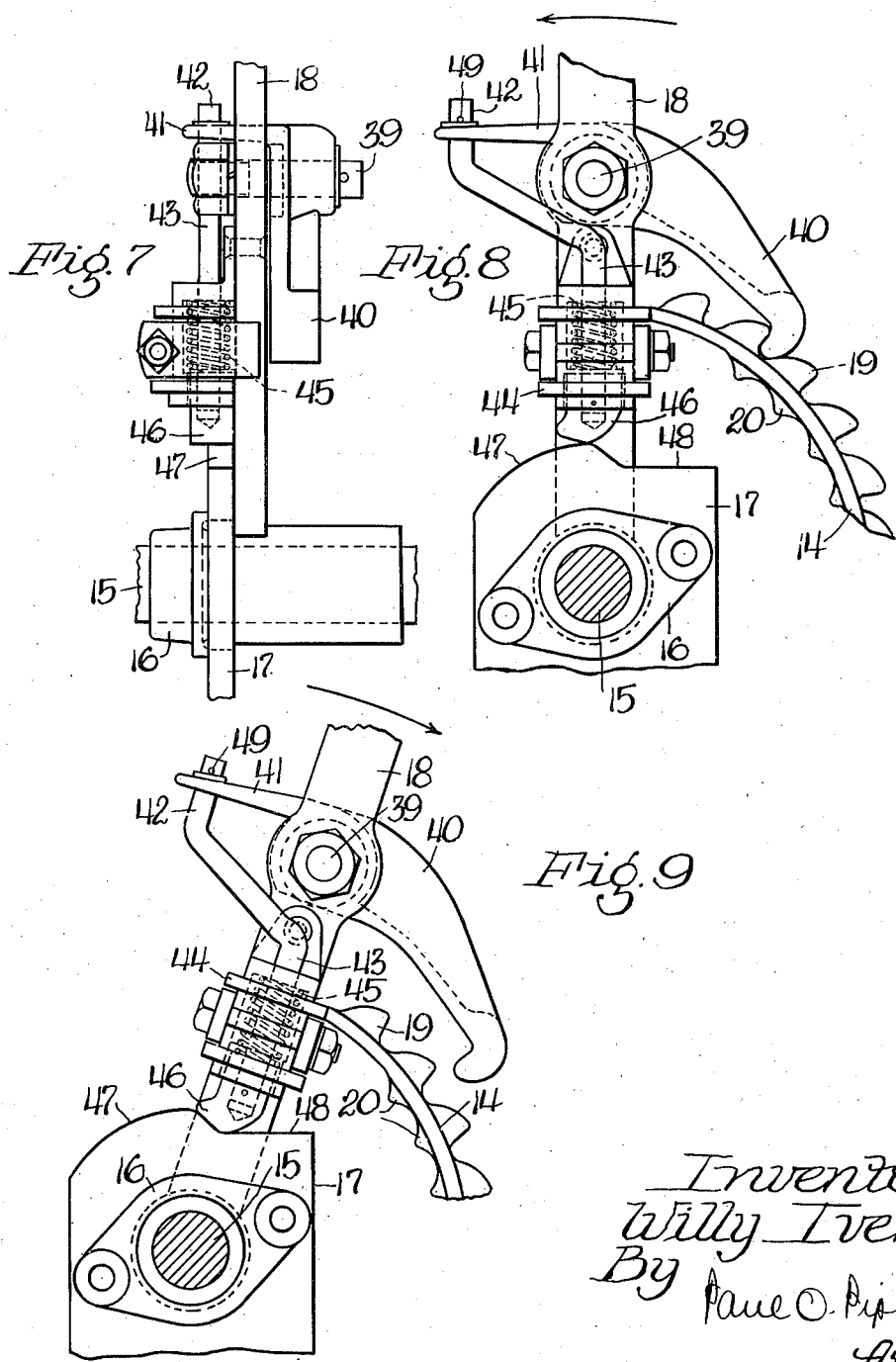

UNITED STATES PATENT OFFICE 2,252,378

MOWER

Willy Iven, Neuss, Germany, assignor to International Harvester Company, a corporation of New Jersey Application March 23, 1939, Serial No. 263,691
In Germany March 31, 1938

18 Claims. (Cl. 56—25)

The present invention relates to mowing machines and is particularly concerned with means for raising and lowering the cutter bar of mowing machines and especially that of a tractor-drawn or tractor-driven mower.

As well known in mowing machines, the cutter bar is hingedly carried at the grassward end of a transversely disposed supporting structure and the latter is provided with lifting gear connected to the cutter bar to permit the bar either to be raised partially to avoid obstructions met with during work, or to be raised at right angles to its normal working position so that the bar may be folded close against the machine, when transporting it from place to place. A typical construction is disclosed in United States patent to S. E. Hilblom, No. 2,052,294, August 25, 1936.

The means provided for lifting the cutter bar usually comprise a rockable element, pivotally mounted on the machine frame and connected by suitable linkage to the cutter bar, which may be moved by means of a lever, usually a hand lever, relative to a fixed element including a series of notches corresponding to the different positions of lift of the cutter bar. A locking pawl is provided in association with the lever which is adapted to enter one or other of the notches in the fixed element, so that the cutter bar may be retained at the desired elevated position. When lowering the bar, the lever effects the removal of the locking pawl from the notch and the bar then falls under its own weight to the working position. Too abrupt falling of the bar with possible damage thereto is prevented by the operator checking the return of the lever by hand.

In the case of a tractor-drawn or tractor-driven mower, such as disclosed in the aforementioned patent, the cutter bar usually extends from the side of the tractor at the rear and the lifting thereof is effected by means of the lever mentioned which is located within the reach of the driver on the tractor. Owing to the higher power available by the use of a tractor, the cutter bar may be of relatively long dimensions, that is, longer than usually provided on a horse-drawn mower, and consequently the weight of the bar is increased and the driver has to exert considerable force to raise the bar, especially as his position on the seat of the tractor does not permit of easy manipulation of the lever. Moreover, when the bar is to be lowered, the driver may have difficulty in retarding the sudden downward movement, and the bar is likely to strike the ground abruptly and so become bent or otherwise damaged.

The principal object of the invention is to provide an improved mower construction by which the difficulties referred to are overcome, specifically by a construction of the lifting gear for the cutter bar wherein the bar may be raised gradually, and in steps, means being provided for holding it against falling back to the normal position, so that the driver can pause between the various steps required to bring the bar to a determined position of lift. Moreover, the construction provides that when the bar is released to allow it to return to the working position, a braking means comes into operation which checks a too sudden fall of the cutter bar, and can be controlled so that the bar falls gently and without shock until it is again at the normal or working position.

Another object of the invention is to provide a rockable element which may be moved by the lifting lever to raise the cutter bar, and which includes a series of teeth adapted to be successively engaged by a pawl associated with the lever, while a second pawl is provided in association with a cooperating fixed part of the frame which second pawl is adapted to engage with a series of ratchet teeth also formed on the said rockable element and acts as a locking pawl.

Another object is to provide a lifting and lowering means wherein movement of the lever in a direction to release the locking pawl to allow the cutter bar to fall to normal, causes a friction element or a braking member to come into operation to check the return movement of the rocking element, consequently checking the falling movement of the cutter bar.

Still another object is to construct and arrange the pawl and the lifting lever so that by a movement of the lever in a direction opposite to that which causes the said pawl to engage the teeth, the pawl is automatically brought out of engagement with the teeth to allow the free movement of the rockable element consistent with the free movement of the cutter bar as it follows the ground contour.

In order that the invention may be readily understood, it will now be described with reference to the accompanying diagrammatic drawings, wherein:

Figure 3 is a view similar to Figure 2, but showing the position of the parts when the cutter bar is being lowered with the braking element in operation.

Figure 5 is an end view of a detail used for mounting certain of the parts shown in Figures 2, 3 and 4 as will be explained hereafter.

Figure 6 is a corresponding side view of said detail.

Figure 7 is a view on the edge of the part of the lifting lever and its associated pawl.

Figure 8 is a corresponding side view showing the pawl in the position when the lever is being used for lifting the cutter bar.

Figure 9 shows the position of the parts when the lever is moved to disengage the pawl from the outer ratchet.

Figure 1:
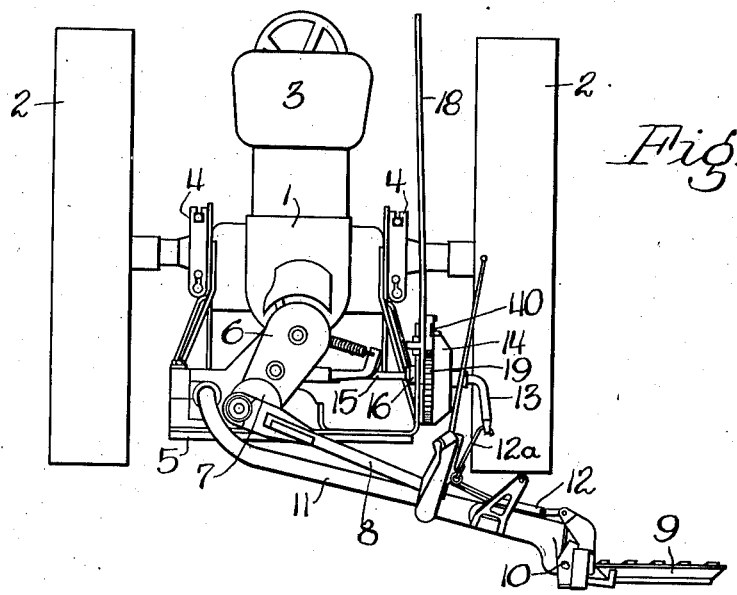
Figure 1 is a rear view of the tractor showing the mower attachment mounted thereon, to illustrate the location of the parts described hereafter.

Referring first to Figure 1, the rear of the body of the tractor is indicated at 1, its road wheels at 2 and the driver's seat at 3. Secured at the rear of the body 1 are upright members 4 which serve for the attachment to the tractor of straps adapted to support a transverse member 5 on which the various parts of the mowing attachment are mounted and supported. A gear-box 6 is mounted on the transverse member 5 and contains gears for driving a fly-wheel 7, these gears being driven by means of a shaft (not shown) connected to the power shaft of the tractor located in front of the gear-box. The fly-wheel 7 carries the usual crank pin for driving a pitman 8 which effects the oscillation of the knife (not shown) forming part of the cutter bar of the mower of which a portion is indicated at 9.

The cutter bar is hingedly carried by means of a hinge-pin 10 at the end of a supporting structure 11 which, in turn, is rockably mounted for a rising and falling movement on the transverse member 5. Secured to the cutter bar 9 near the hinge-pin 10 is one end of a series of links 12, 12a of which the opposite end is attached to an arm 13. The arm 13 extends rearwardly and downwardly from a casing 14 and with the cutter bar in the lowered or working position, as shown in the figure, it is inclined to the ground. The arm is continued through the casing as a rockable member in the form of a shaft 15 journaled in bearings 16 carried by supports mounted on the transverse member 5.

The casing 14 is keyed on the shaft 15 and it encloses the parts now to be described with reference to Figures 2 and 6. The casing is formed as a circular dish-like structure disposed on its edge, of which the open side faces an upright frame member 17 which is conveniently formed by a bent-up portion of the transverse member 5 and which may serve to carry one of the bearings 16 for the shaft 15. Adjacent this member 17 and loosely mounted on the shaft 15 is the lower end of a hand lever 18 of which the upper end extends near the driver's seat (Figure 1).

The casing 14 along a portion of its outer periphery is formed with a series of teeth 19, and the casing is formed at its inner periphery along the same arc with a series of ratchet teeth 20. The casing 14 further contains a casting 21 which is secured to the upright frame member 17 by bolts 22. The form of the casting 21 is seen in Figures 5 and 6. As shown, the casting 21 is formed with a pair of alined ears 23 which carry between them a pin 24 on which a pawl 25 is loosely mounted. Adjacent the ears, the casting is flattened to permit the mounting of a flat spring 26 of which the free end bears against the pawl 25 so pressing it into one or the other of the notches in the ratchet 20. At one side, the casting 21 is formed with a groove or slideway having a narrow bore 27 and an enlarged bore 28. The groove serves to house a bolt 29 which is retained in position in the groove by means of a spacing block 30.

The bolt is formed with a lateral pin 31 which extends through a slot 32 formed in the side of the casting 21. At about the center, the bolt carries a coiled spring 33 which is housed in the larger groove 28 in the casting. One end of the spring bears against the walls of said groove, while the opposite end bears against the pin 31 and tends to hold the pin against one end of the slot 32. At one end, the bolt 29 is provided or formed with a head 34 which preferably is wedge-shaped to correspond with the shape of the cross-section of an arcuate shoe 35 secured inside the casing 14 in any convenient manner and located at the opposite side of the casing from the ratchet surface 20. At the end opposite the head 34, the bolt 29 is extended upwardly and laterally and the lateral portion 36 forms a stop disposed at one side of the pawl 25. As will be understood by reference to Figures 2 and 3, the spring 26 tends to hold the loosely mounted pawl 25 against the stop 36 while the spring 33 normally holds the bolt 29 at a position with the pin 31 against the left-hand end (as seen in Figure 2) of the slot 32 and in this position the head 34 is retained out of contact with the shoe 35.

Figure 4:
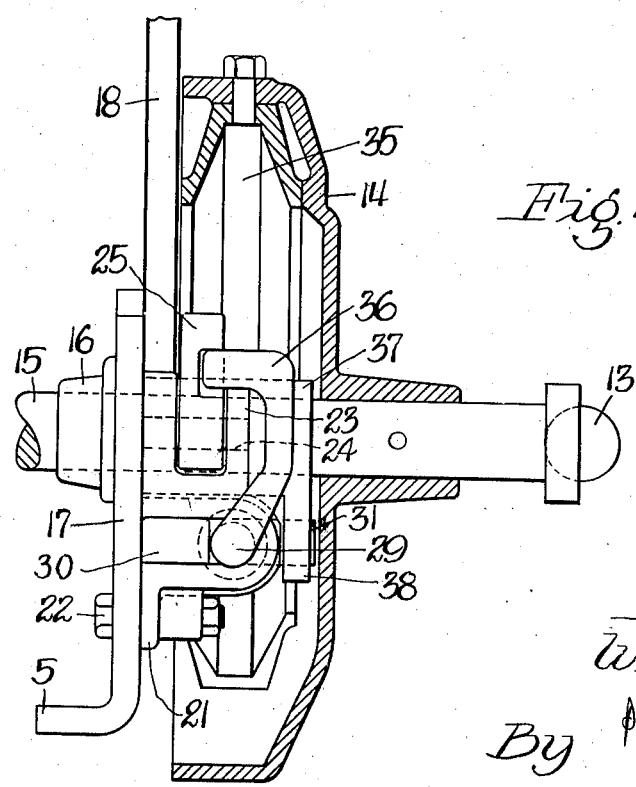
Figure 4 is an end view of the parts shown in Figure 2, the casing including the ratchet teeth and the pawl with lifting lever being omitted.

The hand lever 18 is loosely mounted on the shaft 15 by means of a sleeve 37 formed on the lever (see Figure 4) extending into the interior of the casing 14. The inner side of the sleeve remote from the hand lever 18 is extended downwardly to form a finger portion 38 of which one side bears against the lateral pin 31 on the bolt 29.

As shown in Figures 7 to 9, the hand lever at the side remote from the casing 14 carries a pawl 40 pivoted on the lever by means of a pin or bolt 39. The nose of the pawl is adapted to engage in the notches 19 of the toothed surface formed on the periphery of the casing 14 when the lever is suitably operated. The pawl is extended at the opposite side in a tail portion 41, formed with a vertical bore adapted to receive the end 42 of a rod bent as shown in Figure 8 and which includes a vertical portion 43 carried in a suitable housing 44 mounted on the hand lever. The housing further encloses a coiled spring 45 which bears against the head 46 secured on the lower end of the rod 43. As shown in Figures 8 and 9, the head 46 is formed at its lower end with a rounded portion which is adapted to bear on a cam having a high and a lower surface 47, 48 respectively formed on the upright 17 of the frame. The end 42 of the rod carries a pin 49 to prevent the tail 41 of the pawl coming off the end 42. As will now be understood, the spring 45 tends to hold the head 46 against the cam 47, 48 while the pin 49 bears against the tail 41 of the pawl and tends to force it downwardly.

The above completes the description of the various parts, and their operation will now be briefly referred to.

Figure 2:
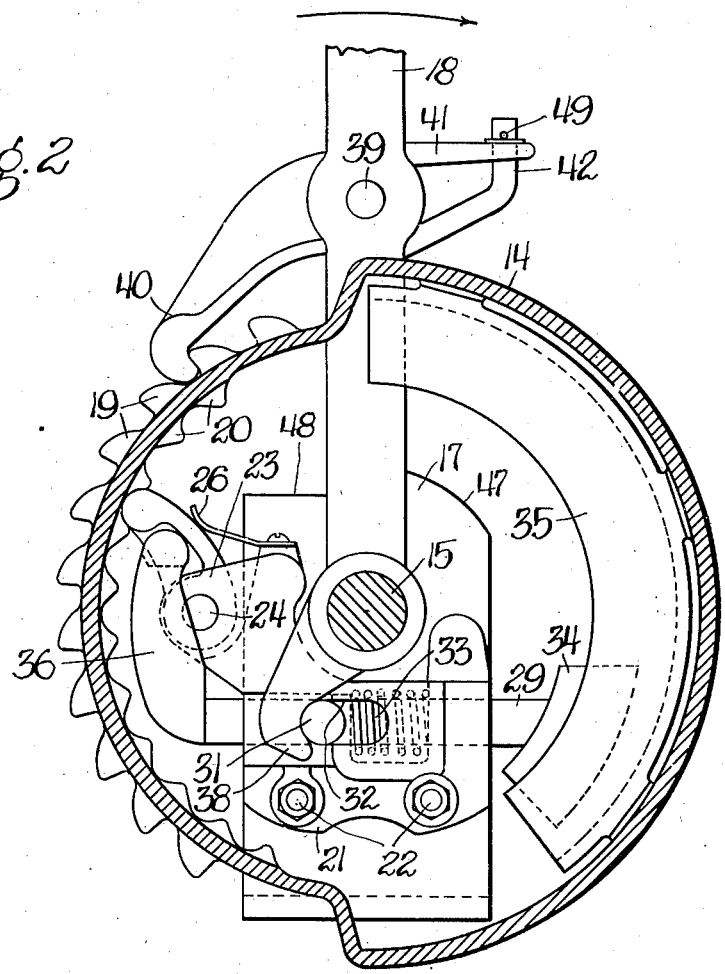
Figure 2 is a side view of the rockable element of the lifting gear and its associated parts, showing the disposition of the lifting lever and the pawl mounted thereon, together with the locking pawl and the brake-operating means. The figure shows the position of the parts when the lever is acting to raise the cutter bar.

Assuming that the tractor mower is working in the field, the cutter bar 9 will be in the lowered or working position as shown in Figure 1 and the parts in the casing 14 will be as seen in Figure 2, except that the hand lever 18 will not be in position to allow the pawl 40 to engage in a notch in the teeth 19. In the disengaged position of the lever, which is shown in Figure 9, the head 46 of the device for controlling the pawl 40 will be on the lower surface 48 of the cam, so that the rod 42 will be moved downwardly and the pin 49 will pull downwardly on the tail 41, so forcing the pawl 40 clear of the teeth. In this way the lever 18 and the parts associated with it will not be connected in any way to the casing 14 and the cutter bar will be free to follow the varying contour of the ground as the mower is moved along the field.

When it is desired to raise the cutter bar 9 to avoid an obstruction, the driver on the tractor pulls the hand lever 18 forwardly (in the direction of the arrow in Figure 2). At the first slight movement of the lever in this direction, the head 46 will be brought on to the higher surface of the cam, so that it is moved upwardly and the pawl 40 will then be in position to enter a notch in the toothed surface 19 (see Figure 8). The driver continues to move the lever forwardly so that the pawl in the notch causes a partial rotation of the casing 14 and consequently also a like rotation of the shaft 15 on which the casing is keyed and this causes a lifting movement of the arm 13, so pulling on the linkage 12, 12a to raise the bar 9 together with the supporting structure 11. The hand lever is then again moved rearwardly to a substantially vertical position to repeat the operation, it being understood that the pawl 40 is enabled to engage in a notch in the teeth further along the row, so that at each subsequent forward movement of the lever the casing 14 is further rotated and the arm 13 and the cutter bar 9 is raised a little higher, care being taken not to move the lever 18 to the position shown in Figure 9, whereat the pawl 40 would become disengaged from the teeth 19. Between the consecutive steps the locking pawl 25 is pressed by the spring 26 into a notch in the ratchet surface 20 so that a return movement of the casing in the opposite direction is effectively prevented.

It should be noted that the driver may, if he so desires, raise the cutter bar in steps corresponding to consecutive notches in the toothed surface 19 or he can push the hand lever a sufficient distance rearwardly to skip certain notches, so lifting the cutter bar a greater distance at each forward movement of the lever, care being taken not to move the lever 18 too far rearwardly, as referred to above. In any case, the pawl 25 engaging in the interior ratchet surface 20 prevents the return movement of the casing 14 and the arm 13 so that the cutter bar cannot fall during the stages of the lifting movement or when the bar is brought to the desired elevated position.

When it is desired to lower the cutter bar, the hand lever 18 is pushed rearwardly beyond the normal position, as set forth above, and the pawl is then raised clear of the ratchet teeth by means of the rod structure 42, 43 already described. At the same time, the rearward movement of the lever (in the direction of the arrow in Figure 3) causes the finger 38 to push on the pin 31 against the pressure of spring 33 so that the complete bolt structure 29 is moved until the pin 31 arrives at the opposite end of the slot 32. The movement of the bolt 29 as described causes the stop 36 to bear against the pawl 25 against the pressure of the spring 26 so that the locking pawl 25 is moved out of engagement with the ratchet surface 20; and the casing 14, together with the shaft 15 and arm 13, are then free to return to the normal position, due to the weight of the cutter bar acting on the linkages 12, 12a. The movement of the bolt 29, however, in the manner just described causes the wedge-shaped head 34 to be forced into the correspondingly shaped shoe 35, so that the head acts as a braking element to prevent a too abrupt fall of the cutter bar. Thus, as soon as the locking pawl 25 is disengaged as described, the cutter bar will fall gently until the normal working position is reached and the driver on the tractor can regulate the rate of fall by a slight rearward pressure on the hand lever which controls the braking elements 34, 35. When the cutter bar is at the normal position, the hand lever is released and the bolt 29 moves to its original position due to the pressure of the spring 33 and the parts are then again set to the working position.

It will be understood that only a preferred embodiment of the invention and its use has been described and that numerous modifications and alterations may be made therein without departing from the spirit and scope of the invention as defined in the appended claims.

What is claimed is:

1. In a mower including a frame, a cutter bar pivoted on the frame for vertical movement from lowered to raised position, a rockable member carried by the frame, a lifting lever, and linkage connected between the member and the cutter bar, the combination with the rockable member of a lifting member carried thereon and rockable therewith, ratchet means between the lever and the lifting member for raising the cutter bar, locking means between the frame and the lifting member for locking the cutter bar when raised, and brake means between the frame and the lifting member and operable by the lever.

2. In a mower including a frame, a cutter bar pivoted on the frame for vertical movement from lowered to raised position, a rockable member carried by the frame, a lifting lever, and linkage connected between the member and the cutter bar, the combination with the rockable member of a lifting member carried thereon and rockable therewith, ratchet means between the lever and the lifting member for raising the cutter bar, locking means between the frame and the lifting member for locking the cutter bar when raised, and brake means between the frame and the lifting member and interconnected with the locking means and operable by the lever.

3. In a mower including a frame, a cutter bar pivoted on the frame for vertical movement from lowered to raised position, a rockable member carried by the frame, a lifting lever associated with the member and movable fore and aft with respect thereto, and linkage between the member and the cutter bar, the combination with the rockable member of a lifting means comprising a ratchet member rockable with the member, a pawl means engageable between the ratchet and the lever for raising the cutter bar, a locking pawl engageable between the ratchet and the frame for locking the cutter bar when raised, a release means associated between the first pawl and the frame and operable by the lever for releasing said pawl from engagement with the ratchet upon predetermined movement of the lever when the cutter bar is in lowered position.

4. In a mower including a frame, a cutter bar pivoted on the frame for vertical movement from lowered to raised position, a rockable member carried by the frame, a lifting lever associated with the member and movable fore and aft with respect thereto, and linkage between the member and the cutter bar, the combination with the rockable member of a lifting means comprising a ratchet member rockable with the member, a pawl means engageable between the ratchet and the lever, a locking pawl engageable between the ratchet and the frame, a release means associated between the first pawl and the frame and operable by the lever, a second release means between the lever and the locking pawl and operable by the lever, both of said means being substantially simultaneously operable by the lever for releasing said pawls from engagement with the ratchet upon predetermined movement of the lever when the cutter bar is in lowered position.

5. In a mower including a frame, a cutter bar pivoted on the frame for vertical movement from lowered to raised position, a rockable member carried by the frame, a lifting lever associated with the member and movable fore and aft with respect thereto, and linkage between the member and the cutter bar, the combination with the rockable member of a lifting means comprising a ratchet rockable with the member, a pawl means engageable between the ratchet and the lever, a locking pawl engageable between the ratchet and the frame, release means between the locking pawl and lever, and a brake means between the frame and the ratchet and operable by the lever, a movement of the lever in one direction engaging the first pawl and ratchet to raise the cutter bar and movement in the opposite direction actuating the release means for releasing the locking pawl and actuating the brake means for slowly lowering the cutter bar.

6. In a mower including a frame, a cutter bar pivoted on the frame for vertical movement from lowered to raised position, a rockable member carried by the frame, a lifting lever associated with the member and movable fore and aft with respect thereto, and linkage between the member and the cutter bar, the combination with the rockable member of a lifting means comprising a ratchet member rockable with the member, a pawl means engageable between the ratchet and the lever; a locking pawl engageable between the ratchet and the frame, and a release means associated with the first pawl and operable by the lever for releasing said pawl from engagement with the ratchet.

7. In a mower including a frame, a cutter bar pivoted on the frame for vertical movement from lowered to raised position, a rockable member carried by the frame, a lifting lever associated with the member and movable fore and aft with respect thereto, and linkage between the member and the cutter bar, the combination with the rockable member of a lifting means comprising a ratchet rockable with the member, a pawl engageable between the ratchet and the lever, a locking pawl engageable between the ratchet and the frame, a release means associated with the first pawl and operable by the lever, and a release means associated with the locking pawl and operable by the lever, both of said means being substantially simultaneously operable by the lever for releasing said pawls from engagement with the ratchet.

8. In a mower including a frame, a cutter bar pivoted on the frame for vertical movement from lowered to raised position, a rockable member carried by the frame, a lifting lever associated with the member and movable fore and aft with respect thereto, and linkage between the member and the cutter bar, the combination with the rockable member of a lifting means comprising a ratchet rockable with the member, a pawl engageable between the ratchet and the lever, a locking pawl engageable between the ratchet and the frame, a release means associated with the first pawl and operable by the lever for releasing said pawl from engagement with the ratchet for lowering the cutter bar, and means for locking said pawl out of engagement when the cutter bar is in lowered position.

9. In a mower including a frame, a cutter bar pivoted on the frame for vertical movement from lowered to raised position, a rockable member carried by the frame, a lifting lever associated with the member and movable fore and aft with respect thereto, and linkage between the member and the cutter bar, the combination with the rockable member of a lifting means comprising a ratchet rockable with the member, a pawl engageable between the ratchet and the lever, a locking pawl engageable between the ratchet and the frame, a release means associated with the first pawl and with the lever, a release means associated with the locking pawl and with the lever, both of said means being operable by the lever for releasing said pawls from engagement with the ratchet for lowering the cutter bar, and means for locking said pawls out of engagement when the cutter bar is in lowered position.

10. In a mower having a frame and a cutter bar carried thereby for vertical movement from operative to raised position, lifting means carried on the frame and comprising pawl and ratchet mechanism including a movable element connected to the cutter bar, an actuating lever for operating the mechanism to move said element for raising the cutter bar, and friction brake means operable by the lever and engageable with the movable element for lowering the cutter bar slowly to operative position.

11. In a mower having a frame and a cutter bar hingedly carried thereby for vertical movement from operative to raised position and for free movement while in operative position to follow substantially the ground contour, lifting means carried on the frame and connected to the cutter bar, said means comprising pawl and ratchet mechanism, an actuating lever therefor for raising the cutter bar, and means associated between the pawl and ratchet mechanism and the lever and operable by the lever in a predetermined position thereof to render the pawl and ratchet mechanism inoperative while the cutter bar is in operative position.

12. In a mower including a frame, a cutter bar hingedly carried thereby for vertical movement, a rock-shaft carried by the frame, and linkage connected between the rock-shaft and the cutter bar, the combination with the rock-shaft of a ratchet member rigidly carried thereby, a lever movably carried on the rock-shaft, a pawl movably carried by the lever and engaging the ratchet member for rocking the rock-shaft, a second pawl movably carried by the frame and engaging the ratchet member for locking the rock-shaft when the cutter bar is raised, cam means carried by the frame and associated with the first pawl and lever for moving said pawl out of engagement with the ratchet at a predetermined position of the lever, a brake means movably carried by the frame and operable by the lever to engage the ratchet member, said brake means being also associated with the second pawl for moving said pawl out of engagement with the ratchet member.

13. In a mower having a frame and a cutter bar hingedly carried thereby for vertical movement from operative to raised position and for free movement in operative position to follow the ground contour, the combination therewith of lifting and lowering mechanism carried by the frame for raising and lowering the cutter bar and comprising pawl and ratchet mechanism, said mechanism including a ratchet, an operating lever mounted for movement in opposite directions, a pawl carried by the lever and engaging the member, a second pawl for locking the member, and means associated with the lever for releasing said pawls from engagement with the member for permitting the aforesaid free movement of the cutter bar in operative position, said means including members associated with the lever and the pawls and operative to release the pawls at a predetermined position of the lever.

14. In a mower having a frame and a cutter bar hingedly carried by the frame for vertical movement from operative to raised position, the combination therewith of step-by-step lifting mechanism carried on the frame for raising the cutter bar, said mechanism including a rockable member, linkage between the member and the cutter bar, a lever rockable with respect to the member, a pawl carried by the lever and engageable with the member for raising the cutter bar, a locking pawl carried by the frame and engageable with the member for locking the mechanism when the cutter bar is raised, and means associated with the pawls and controlled by a predetermined position of the lever for releasing the pawls from the member to lower the cutter bar, said means serving also to lock said pawls in said released position.

15. In a mower having a frame and a cutter bar hingedly carried thereby for movement from lowered to raised position, the combination therewith of pawl and ratchet mechanism carried on the frame for raising and lowering the cutter bar and including a movable element connected to the cutter bar, a lever rockable fore and aft for actuating said mechanism to move the element for raising the cutter bar, and a friction brake means associated with the mechanism and operable by the lever upon excess movement thereof in one direction to engage the movable element for lowering the cutter bar slowly.

16. In a mower having a frame and a cutter bar hingedly carried thereby for movement from lowered to raised position, the combination therewith of raising and lowering mechanism carried by the frame and associated with the cutter bar, said mechanism including a ratchet member, a lifting pawl, a lever movable fore and aft and associated with the pawl to actuate the mechanism to raise the cutter bar, a locking pawl for locking the mechanism when the cutter bar is raised, and a brake means associated with the mechanism and interconnected with the locking pawl, said lever being engageable with the brake means to actuate same and to release the locking pawl for lowering the cutter bar slowly.

17. In a mower having a frame and a cutter bar hingedly carried thereby for movement from lowered to raised position, the combination therewith of a ratchet member carried by the frame and associated with the cutter bar, a lifting pawl engaging the member, a locking pawl engaging the member, a brake means associated with the member, and a lever carried by the frame movable fore and aft and associated with the lifting pawl to actuate the ratchet member for raising the cutter bar, said lever being connected to the brake means and locking pawl for applying the brake upon excess movement in one direction and for releasing the locking pawl for lowering the cutter bar slowly.

18. In a mower having a frame and a cutter bar hingedly carried thereby for movement from lowered to raised position, the combination therewith of a ratchet member carried by the frame and associated with the cutter bar, a lifting pawl engaging the member, a locking pawl engaging the member, a brake means associated with the member, a lever carried by the frame and associated with the lifting pawl, said lever being movable fore and aft within predetermined limits to actuate the ratchet member for raising the cutter bar, said lever being connected to both the brake means and locking pawl and movable in one direction in excess of the aforesaid limits to apply the brake and to release the locking pawl for lowering the cutter bar slowly, and means associated with the lever and the lifting pawl for moving said pawl out of engagement with the ratchet wheel upon the aforesaid excess lever movement, and means for locking the lever in an intermediate position with the pawls and brake means released.

WILLY IVEN.